US012386027B2

(12) United States Patent
Longman et al.

(10) Patent No.: US 12,386,027 B2
(45) Date of Patent: Aug. 12, 2025

(54) RADAR INTERFERENCE MITIGATION BY MONITORING OF CHANNELS AND SWITCHING TO INTERFERENCE-FREE CHANNEL

(71) Applicant: GM GLOBAL TECHNOLOGY OPERATIONS LLC, Detroit, MI (US)

(72) Inventors: Oren Longman, Tel Aviv (IL); Oded Bialer, Petah Tikva (IL)

(73) Assignee: GM Global Technology Operations LLC, Detroit, MI (US)

( * ) Notice: Subject to any disclaimer, the term of this patent is extended or adjusted under 35 U.S.C. 154(b) by 353 days.

(21) Appl. No.: 18/168,225

(22) Filed: Feb. 13, 2023

(65) Prior Publication Data

US 2024/0272270 A1    Aug. 15, 2024

(51) Int. Cl.
*G01S 13/58*    (2006.01)
*G01S 7/02*    (2006.01)
*G01S 13/931*    (2020.01)

(52) U.S. Cl.
CPC ............ *G01S 7/023* (2013.01); *G01S 13/584* (2013.01); *G01S 13/931* (2013.01)

(58) Field of Classification Search
CPC .... G01S 13/343; G01S 13/584; G01S 13/931; G01S 7/023; G01S 7/0232
See application file for complete search history.

(56) References Cited

U.S. PATENT DOCUMENTS

| | | | |
|---|---|---|---|
| 2017/0059691 A1* | 3/2017 | Fischer | G01F 23/284 |
| 2017/0285324 A1* | 10/2017 | Hua | A61B 1/0607 |
| 2022/0326369 A1* | 10/2022 | Song | G01S 13/56 |
| 2023/0010398 A1* | 1/2023 | Wall | G01S 13/103 |
| 2023/0118317 A1* | 4/2023 | Melzer | G01S 13/50 |
| | | | 375/346 |

* cited by examiner

*Primary Examiner* — Timothy A Brainard
(74) *Attorney, Agent, or Firm* — Quinn IP Law

(57) ABSTRACT

A method includes performing object detection by a radar sensor system. The object detection includes generating and transmitting object-detection (OD) chirps on an OD channel of a plurality of radar channels employed by the radar sensor system. The method further includes monitoring unused radar channels for interference and determining that at least one of the unused radar channels is free of interference. The method still further includes performing object detection by generating and transmitting one or more OD chirps on the determined interference-free channel.

20 Claims, 3 Drawing Sheets

RADAR INTERFERENCE MITIGATION BY MONITORING OF CHANNELS AND SWITCHING TO INTERFERENCE-FREE CHANNEL

This disclosure relates to techniques for mitigating radar interference.

Automotive radar is the most promising and fastest-growing civilian application of radar technology. Vehicular radars provide the key enabling technology for the autonomous driving revolution that has the potential to improve everyone's day-to-day lives. Automotive radars, along with other sensors such as lidar, (which stands for "light detection and ranging"), ultrasound, and cameras, form the backbone of self-driving cars and advanced driver assistant systems (ADASs). These technological advancements are enabled by extremely complex systems with a long signal processing path from radars/sensors to the controller. Automotive radar systems are responsible for the detection of objects and obstacles, their position, and speed relative to the vehicle.

SUMMARY

According to one embodiment, a method that facilitates the mitigation of radar interference, the method includes performing object detection by a radar sensor system. The performing of object detection includes generating and transmitting one or more object-detection (OD) chirps on an OD channel, which is one of a plurality of radar channels employed by a radar sensor system. The method also includes monitoring one or more unused radar channels for interference. The unused radar channels include the plurality of the radar channels other than the OD channel. The method further includes determining that at least one of the unused radar channels is free of interference and performing object detection by generating and transmitting one or more OD chirps on the determined interference-free channel.

In this embodiment of the method, the monitoring of one or more unused radar channels includes selecting a sniffing channel, which is one of the unused radar channels; generating one or more sniffing chirps on the sniffing channel; and receiving sniffing-channel signal energy via the sniffing channel.

With this embodiment of the method, the selection of the sniffing channel includes utilizing an unused channel that is frequency-shifted and/or time-shifted from the OD channel.

With this embodiment, the determination includes measuring radar interference of the sniffing channel based, at least in part, on the sniffing-channel signal energy; and determining that the sniffing channel is interference-free based, at least in part, on the measured radar interference of the sniffing channel.

In this embodiment of the method includes, in response to receiving the sniffing-channel signal energy, processing the sniffing-channel signal energy, wherein the processing minimizes radar interference caused by transmissions from the radar sensor system.

In this embodiment, the generating sniffing chirps on the one or more unused channels; attenuating the one or more sniffing chirps on the one or more unused channels; receiving signal energy of the one or more unused channels; and tracking the received signal energy in association with the one or more unused channels.

In this embodiment, the determination that at least one of the unused radar channels is free of interference includes selecting one of the one or more unused radar channels to be the determined interference-free channel, wherein the selecting is based, at least in part, on the tracked signal energy associated with the one or more selected radar channels.

In this embodiment of the method, the method further includes monitoring the OD channel for interference, determining that the OD channel exhibits interference; and switching the OD channel to match the determined interference-free channel.

In this embodiment of the method, the monitoring of the OD channel includes receiving OD channel signal energy via the OD channel; the determining interference of the OD channel is based, at least in part, on the measured radar interference of the OD channel; and the switching includes, in response to the interference determination on the OD channel, updating the OD channel to the determined interference-free channel.

Other embodiments include a device selected from a group consisting of a vehicle, an autonomous vehicle, a semi-autonomous vehicle, a video surveillance system, a medical imaging system, a video or image editing system, an object tracking system, a video or image search or retrieval system, and a weather forecasting system, the device is configured to perform the above-mentioned method.

According to yet another embodiment, the method includes performing object detection by a radar sensor system, which includes generating and transmitting one or more object-detection (OD) chirps on an OD channel. The OD channel is one of the plurality of radar channels employed by a radar sensor system. The method also includes monitoring one or more unused radar channels for interference. The unused radar channels include the plurality of the radar channels other than the OD channel and the monitoring includes selecting a sniffing channel, which is one of the unused radar channels, generating one or more sniffing chirps on the sniffing channel, and receiving sniffing-channel signal energy via the sniffing channel. The method further includes determining that at least one of the unused radar channels is free of interference and performing object detection by generating and transmitting one or more OD chirps on the determined interference-free channel.

In this embodiment, the selection of the sniffing channel includes utilizing an unused channel that is frequency-shifted and/or time-shifted from the OD channel.

With this embodiment, the determination includes measuring radar interference of the sniffing channel based, at least in part, on the sniffing-channel signal energy; and determining that the sniffing channel is interference-free based, at least in part, on the measured radar interference of the sniffing channel.

In this embodiment of the method, the monitoring of the one or more unused radar channels includes generating sniffing chirps on the one or more unused channels; attenuating the one or more sniffing chirps on the sniffing channel; receiving the signal energy of the one or more unused channels; and tracking the received signal energy in association with the one or more unused channels.

Another embodiment of the method, the determination that at least one of the unused radar channels is free of interference includes selecting one of the one or more unused radar channels to be the determined interference-free channel, wherein the selecting is based, at least in part, on the tracked signal energy associated with the one or more selected radar channels.

Another embodiment of the method, the monitoring of the OD channel includes receiving OD channel signal energy via the OD channel; the determining interference of the OD channel is based, at least in part, on the measured radar interference of the OD channel; and the switching includes, in response to the interference determination on the OD channel, updating the OD channel to the determined interference-free channel.

According to yet another embodiment, a non-transitory machine-readable storage medium encoded with instructions executable by one or more processors that, when executed, direct one or more processors to perform operations that facilitate mitigation of radar interference. These operations include measuring radar interference on a first channel of a plurality of radar channels employed by a radar sensor system; determining that the first channel is interference-free based, at least in part, on the measured radar interference of the first channel; performing object detection over a second channel of the plurality of radar channels; measuring radar interference on the second channel; determining that the second channel has interference based, at least in part, on the measured radar interference of the second channel; and in response to the interference determination, performing object detection over the first channel of the plurality of radar channels.

The non-transitory machine-readable storage medium embodiment in which the first channel being frequency-shifted and/or time-shifted from the second channel.

In the non-transitory machine-readable storage medium embodiment in which the measuring of radar interference on the first channel includes generating sniffing chirps on multiple channels of the plurality of radar channels, the multiple channels include the first channel; attenuating the one or more sniffing chirps on the sniffing channel; receiving signal energy of the multiple channels; and storing, in a memory, the received signal energy in association with the multiple channels.

The non-transitory machine-readable storage medium embodiment in which the operations further include selecting the first channel to perform object detection in response to the interference determination, wherein the selection is based, at least in part on, the stored signal energy associated with the first channel.

The above features and advantages, and other features and advantages of the present teachings are readily apparent from the following detailed description of some of the best modes and other embodiments for carrying out the present teachings, as defined in the appended claims when taken in connection with the accompanying drawings.

DETAILED DESCRIPTION

Figure 1:
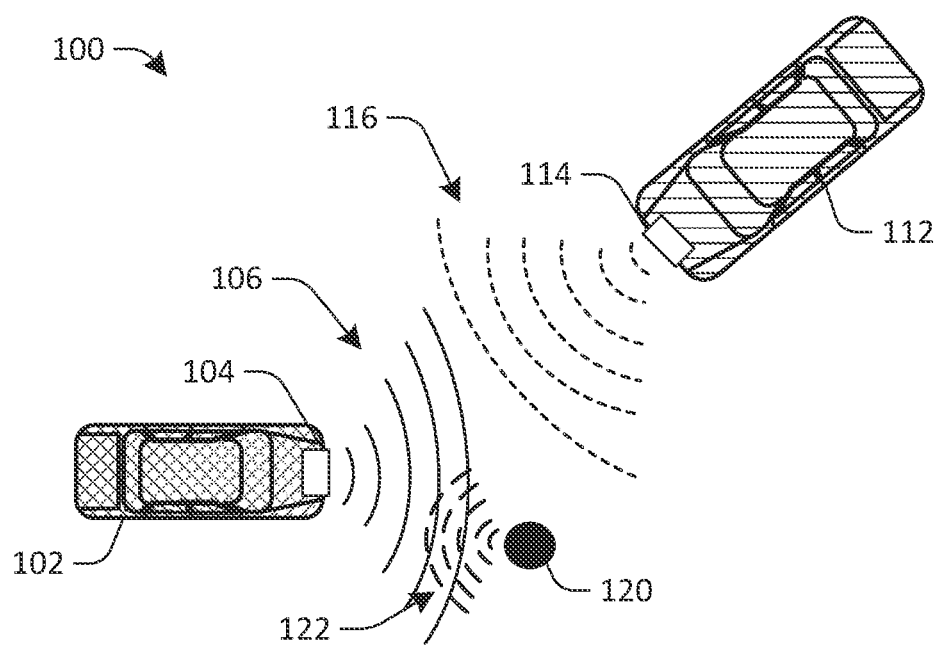
FIG. 1 illustrates an example scenario of a radar sensor system operating in a multiple radar environment, in accordance with one or more implementations described herein.
Figure 1:
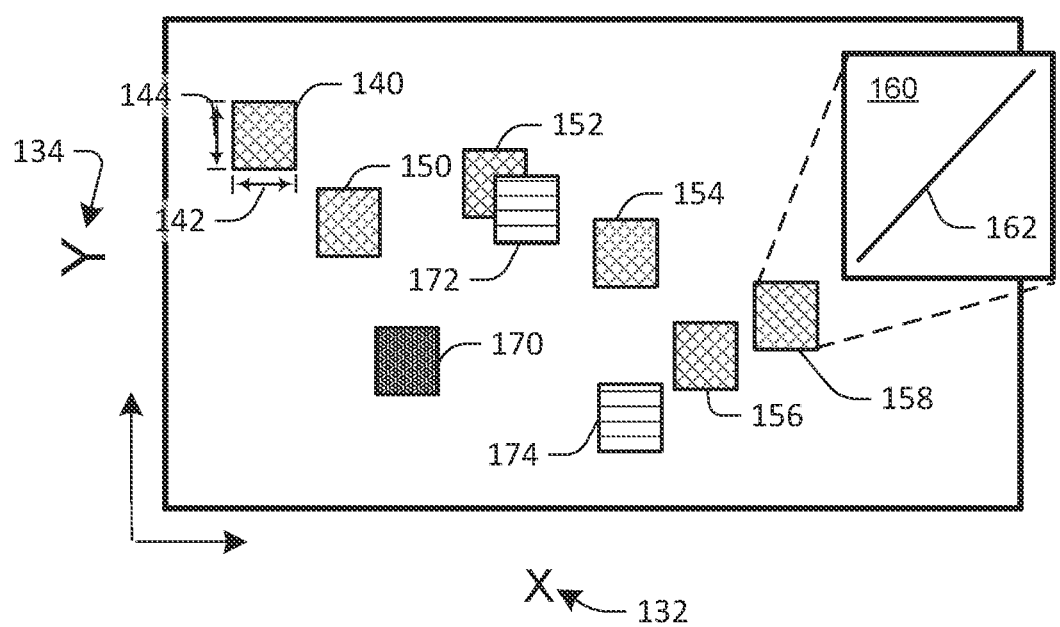

The technology described herein facilitates the mitigation of radar interference by monitoring available radar channels and switching to an available interference-free channel.

Referring now to the drawings, wherein like numerals indicate like parts in the several views of various systems and approaches are shown and described herein. Disclosed approaches may be suitable for object detection for automotive vehicles, such as for autonomous or semi-autonomous driving.

The present disclosure may be described with respect to an example first vehicle 102, which is described in more detail herein with respect to FIG. 1. Although the present disclosure primarily provides examples using automobiles, other types of devices may be used to implement those various approaches described herein, such as robots, camera systems, weather forecasting devices, medical imaging devices, etc. In addition, these approaches may be used for controlling autonomous or semi-autonomous vehicles, or for other purposes, such as, without limitation, video surveillance, video or image editing, video or image search or retrieval, object tracking, weather forecasting, and/or medical imaging (e.g., using ultrasound or magnetic resonance imaging (MRI) data).

FIG. 1 illustrates an example scenario 100 in which a radar sensor system, in accordance with the technology described herein, operates in a multiple radar environment. More particularly, this figure depicts a first vehicle 102 and a second vehicle 112. The first vehicle 102 is an automobile with a radar sensor system 104 for object detection purposes. Likewise, the second vehicle 112 is an automobile with a radar sensor system 114 for object detection purposes.

Vehicles often perform radar-based object detection using a vehicle-based radar sensor system to detect objects and measure their distance, speed, and other characteristics. As depicted, the first vehicle 102 has a radar sensor system 104 and the second vehicle 112 has a radar sensor system 114. As shown in FIG. 1, the radar sensor systems 104 and 114 transmit electromagnetic (i.e., radio) waves 106 and 116 respectively.

An object 120 may reflect the transmitted radio waves (such as waves 106) to the radar sensor system 104, which is shown by reflection waves 122. The radar sensor system then detects the reflected waves that bounce back from objects in their field of view (i.e., scene). By analyzing the properties of the reflected waves, radar sensors can infer the presence, location, and movement of objects in the environment.

As shown in FIG. 1, the radio waves 116 emitted from the radar sensor system 114 of the second vehicle 112 can potentially interfere with the radar sensor system 104 of the first vehicle. The interference, for example, may occur when the radio waves 116 transmitted from the second vehicle may be received by the radar sensor system 104 of the first vehicle 102 on the channel for which the radar sensor system 104 was awaiting a reflected wave, like that of reflection waves 122. Consequently, a reflection of object 120 may be muddled or canceled by the additional signal noise introduced by the radio waves 116 transmitted from the second vehicle.

The radar sensor systems 104 and 114 may be configured to employ frequency-modulated continuous wave (FMCW) emission as a chirp is a form of phase modulation that results in linear frequency modulation. FMCW chirp is the standard modulation format used in most solid-state radar sensor systems.

Radar-based object detection is used in a wide range of applications, including autonomous vehicles, aviation, and industrial automation. It has several advantages over other types of object detection technologies, such as the ability to operate in poor visibility conditions (e.g., fog, rain, snow) and to detect objects that are not visible to cameras (e.g., behind walls or around corners).

There are several different types of radar-based object detection systems, including continuous-wave radar, frequency-modulated continuous-wave radar, and pulsed radar. Each type has its own set of characteristics and applications. For example, continuous-wave radar is often used for long-range detection, while pulsed radar is more suitable for short-range detection with high resolution.

Using radar-based object detection, vehicles can detect and avoid nearby cars, obstacles, and other objects. Automotive radar systems typically include a radar sensor system, that includes a transmitter and receiver. The transmitter sends out radio waves that hit an object and bounce back to the receiver. This bounce back is called a reflection. The radar system determines the properties of a reflection to help determine an object's location and speed relative to the vehicle.

More particularly, the radar system may create a reflective-intensity (RI) spectrum, which may be called a reflective intensity image (RII) in two dimensions or reflective intensity volume (RIV) in three dimensions (or perhaps more dimensions). The RIV maps out the reflection intensity across three domains (i.e., dimensions) of the measured or calculated properties of the received reflections: range, speed ("Doppler"), and azimuth. Thus, the RIV may be considered a three-dimensional cube of reflection intensity data in the categories of range, Doppler, and azimuth.

In some instances, the RIV may map out the reflection intensity in more than three domains of measured or calculated properties of the received reflections. Some of those domains include range, Doppler, azimuth, and elevation.

The range reflective-intensity domain indicates a distance with respect to reflection points and the radar sensor system. That is, based on reflective intensity, the range domain indicates distances between reflection points and the radar sensor system. The reflection point is a candidate to be a detected object. The range is the one-dimensional linear distance between the radar sensor system and reflection points.

The Doppler reflective-intensity domain indicates a radial velocity (i.e., speed) of reflection points with respect to the radar sensor system. That is, based on reflective intensity, the Doppler domain indicates the radial velocity of reflection points with respect to the radar sensor system. The radial velocity is the velocity of a reflection point (i.e., candidate object) along the line of sight from the observer (i.e., the radar sensor system) to the reflection point. The radial velocity is determined utilizing the familiar Doppler effect or shift. That is, the change in the received signal frequency due to the movement of the reflected object relative to the radar sensor system.

The azimuth reflective-intensity domain indicates an angular distance with respect to reflection points and the radar sensor system. That is, the azimuth domain indicates the reflective intensity of reflection points at various azimuths (i.e., angles) from the radar sensor system. The azimuth is the one-dimensional angular distance between the radar sensor system and reflection points.

Other implementations may utilize other domains of reflective intensity as part of the three or more dimensions. For example, an elevation reflective-intensity domain indicates the reflective intensity of reflection points at various elevations (i.e., heights). The elevation is the one-dimensional elevation of reflection points.

As radar-based object detection becomes more common, interference between radar sensor system also become increasingly more common. And the typical approaches to the mitigation of radar interference are insufficient in the face of increasing occurrences of interference.

Once radar interference is detected on an operating object-detection (OD) channel, the typical approaches to radar-interference mitigation involve a blind switch of another available radar channel. The to-be-switched-to channel may be selected randomly, procedurally, via a pattern, or the like. The switch is called blind because it is made without information about whether the one or more selected radar channels is free of interference. Thus, as the number of radar-equipped vehicles filling the roadways increases, it becomes increasingly likely that a blind switch will beget another blind switch. That is because the to-be-switched-to channel also has interference. This results in a large duration of radar blockage.

FIG. 1 also shows a radar-channel chart 130 that charts examples of radar channels that may be employed by the radar sensor system 104. The X-axis 132 of chart 130 shows time increasing from left to right. The Y-axis 134 of chart 130 shows increasing radio frequency from bottom to top. In the chart are multiple rectangles, which represent a radio channel. Herein, a radio channel may be called a slot, band, or allocation.

Channels 140, 150, 152, 154, 156, and 158 include chirps emitted by the radar sensor system 104 of the first vehicle 102. Channel 170 includes a chirp emitted by some other non-illustrated vehicle. Channels 172 and 174 include chirps emitted by the radar sensor system 114 of the second vehicle 112.

As shown by channel 140, the channels have two dimensions: an allocation of time 142 and a frequency 144. This means that each change represents a defined range of time and a defined range of frequency. As depicted here, the channels are all the same size. This is because the channel allocation is consistent with the example radar sensor system 104. However, in other implementations, the frequency allocation and time allocation of a channel may be adjustable.

Notice that channels 152 and 172 overlap each other in both time and frequency. Consequently, there is a strong likelihood that the transmitted signals of channel 172 from the second vehicle 112 will interfere with the receiving of the expected reflections of channel 152 of the first vehicle 102.

As can be seen in chart 130, channels 140, 150, 170, 154, 174, 156, and 158 are isolated from any other channels. That is, none of these channels overlap with one another in both time and frequency. Although channels 154 and 174 coincide (i.e., occur at the same time), they are unlikely to interfere with each other because their range of frequencies does not overlap (nor are they adjacent). Similarly, channels 156 and 170 occupy the same frequency range. However, they are unlikely to interfere with each other because they do not occur at the same (nearly the same) time.

The channels are depicted as rectangles because each channel includes a chirp. As shown by a close-up depiction 160 of channel 158, a chirp 162 is a linearly ramped pulse signal. That is, the chirp 162 is a signal where the frequency is modulated linearly over time. Thus, as noted above, the channel has both time and frequency ranges because their chirps do.

With a particular radar sensor system (such as system 104), successive OD channels occur at fixed (e.g., predictable) intervals of time and frequencies. As noted above, each channel occupies a known time span and frequency range. To increase the predictability, the OD chirps occur at regular intervals. Thus, the OD channels occur at regular intervals (of time and frequency). That said, the regularity of the channels is specific to their source. Different sources have different intervals. Thus, overlap may occur. In addition, a radar sensor system may initiate object detection of its own accord and without reference to an external time clock. Thus, the base of the regular intervals may change from time to time.

Figure 2:
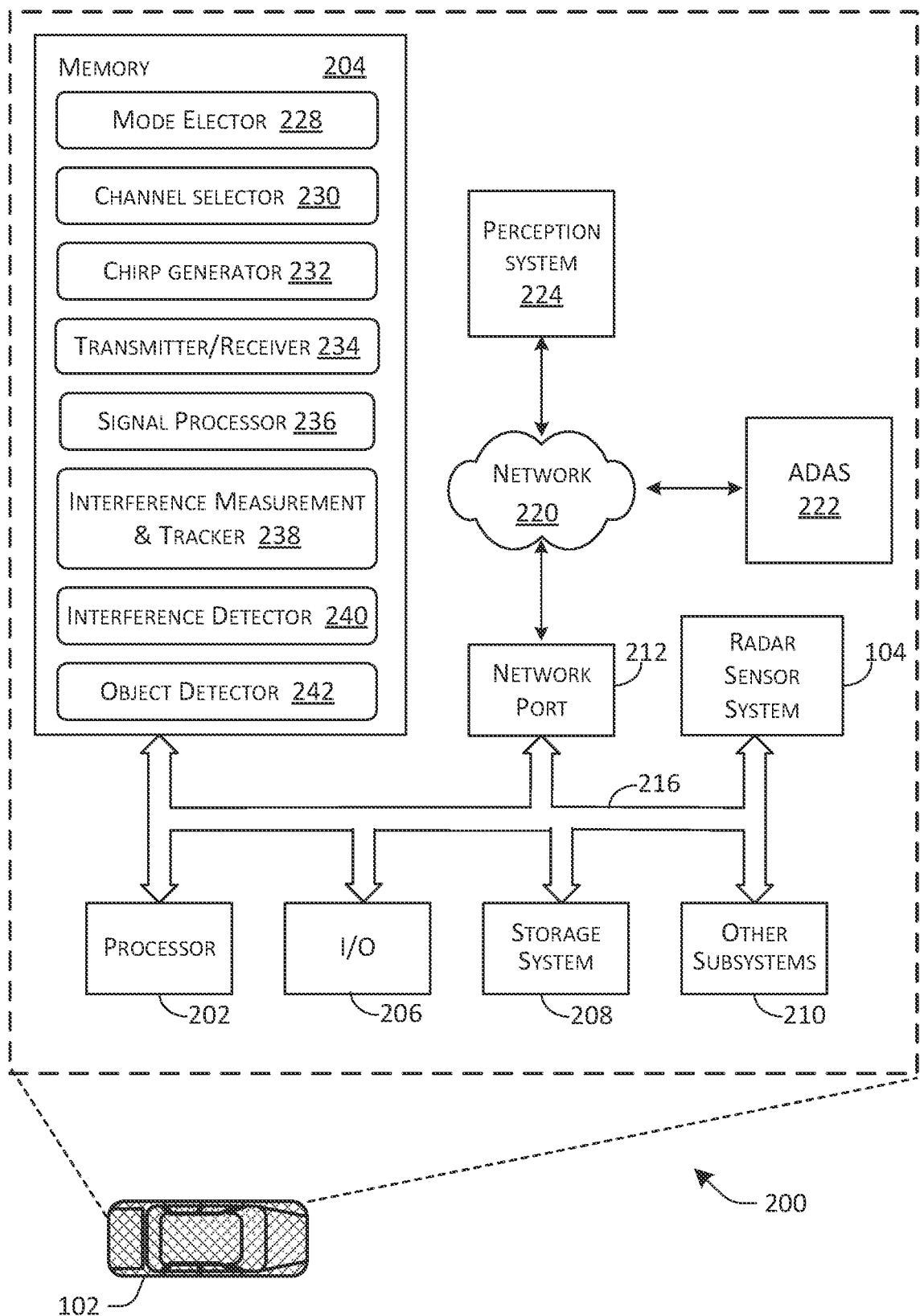
FIG. 2 illustrates an example of computer architecture for a computing system capable of executing the technology described herein.

FIG. 2 illustrates an example of computer architecture for a computing system 200 capable of executing the technology described herein. The computer architecture shown in this figure illustrates a typical computer, server computer, workstation, desktop computer, laptop, tablet, network appliance, e-reader, smartphone, or another computing device. The computer system 200 may be part of first vehicle 102 and can be utilized to execute the functionalities presented herein.

The computing system 200 includes a processor 202 (e.g., central processor unit or "CPU"), system storage (e.g., memory) 204, input/output (I/O) devices 206—such as a display, a keyboard, a mouse, and associated controllers, a secondary storage system 208 (e.g., a hard drive), and various other subsystems 210. In various embodiments, the computing system 200 also includes network port 212 operable to connect to a network 220, which is likewise accessible by an advanced driver assistant system (ADAS) 222 and perception system 224. The computing system 200 may include or be connected to the radar sensor system 104. The foregoing components may be interconnected via one or more buses 216 and/or network 220.

The radar sensor system 104 may include an antenna array of multiple antennas, which transmit and/or receive over multiple different channels. The different transmit channels are used to drive different antennas. These multiple transmit channels also provide beamsteering capabilities. The antenna array may include multiple receive antennas, which are configured to receive multiple receive channels. The multiple receive channels give the angular information about the object as there is a phase difference between signals received by different receive antennas.

The radar sensor system 104 receives the reflected signals to help determine objects' locations and speeds relative to the first vehicle 102. The radar sensor system 104 monitors the area or volume around first vehicle 102. Herein, unless the context indicates otherwise, that monitored area or volume is called a scene. For example, as shown in FIG. 1, the scene for the first vehicle 102 is the area or volume proximate to the forward direction of the first vehicle 102.

Returning to FIG. 2, the ADAS 222 may be configured to assist drivers of first vehicle 102 in driving or parking functions. In some instances, the ADAS 222 may enable various levels of autonomous driving. Some of the functions that the ADAS 222 may enable or enhance include, for example, adaptive cruise control, automatic parking, autonomous valet parking, navigation, blind spot monitoring, automatic emergency braking, etc. The ADAS 222 may use the object detection results from the object detector module 242 and/or classification from the perception system 224 to perform or assist in the performance of its functionalities.

The perception system 224 may be configured to perform object detection, segmentation, and/or classification. In some instances, the perception system 224 may use the object detection results from the object detector module 242 to indicate a presence of a relevant item that is proximate to first vehicle 102 and/or a classification of the item as an item type (e.g., cyclist, animal, car, pedestrian, building, tree, road surface, curb, sidewalk, unknown, etc.).

Additionally, or alternatively, the perception system 224 may indicate one or more characteristics associated with a detected item and/or the environment in which the item is positioned. For example, the characteristics associated with an item may include, but are not limited to, an x-position, a y-position, a z-position, an orientation (e.g., a roll, pitch, yaw), an item type (e.g., a classification), a velocity of the item, an acceleration of the item, an extent of the item (size), etc. Characteristics associated with the environment may include but are not limited to, the presence of another item in the environment, a state of another item in the environment, a time of day, a day of a week, a season, a weather condition, an indication of darkness/light, etc.

System memory 204 may store data and machine-readable instructions (e.g., computer-readable instructions). The computing system 200 may be configured by machine-readable instructions. Machine-readable instructions may include one or more instruction modules. The instruction modules may include computer program modules. The instruction modules may include one or more of a mode elector 228, channel selector 230, a chirp generator 232, a transmitter/receiver module 234, a signal processor module 236, an interference measurement & tracker module 238, an interference detector module 240, an object detector module 242, and/or other instruction-based modules.

While the modules in the example depicted by this figure are implemented as modules using machine-readable instructions, other implementations of similarly functioning modules may be implemented using little to no machine-readable instructions. That is, such modules are implemented via hardware (e.g., circuitry) and analog and/or digital signals. In other instances, such modules may be implemented via a combination of hardware and machine-implemented instructions.

The mode elector 228 may be configured to elect or choose a mode of operation, which may be, for example, object-detection (OD) mode or sniffing mode. The mode election may affect how other modules operate. In some instances, just one active channel of the multiple (i.e., plurality) of the radar channel of the radar sensor system 104 is operating at a time. That is, the radar sensor system is transmitting and/or receiving over a singular active channel. Consequently, the mode elector 228 determines whether that active channel is performing purposeful object detection or focused on monitoring for interference.

When in the OD mode, the other modules will direct their actions to perform object detection. The performance of object detection includes both generating and transmitting one or more OD chirps on an OD channel. OD chirps are specifically intended and designed to detect objects. OD chirps are both generated (typically on a synchronized chirp generator) and transmitted by the radar sensor system 104. The OD channel is the assigned (i.e., present) channel being employed for object detection.

When in the sniffing mode, the other modules will direct their actions to monitor one or more unused radar channels for interference. An unused radar channel is one of the plurality of the radar channels other than the assigned OD channel. Stated differently, an unused radar channel is a channel available to be used as the OD channel, but it is not presented assigned as such. An unused radar channel is any channel other than the assigned OD channel. When in sniffing mode, the channel presently being monitored is called the sniffing channel, herein.

In addition, the mode elector 228 may select an idle mode. In idle mode, the system is in neither OD nor sniffing mode. No chirps are generated or transmitted. No signals are received. The system may be processing data or doing nothing at all when in idle mode.

The mode elector 228 also stores mutable records or registers that indicate the assigned OD channel and assigned sniffing channel. When in OD mode, object detection is performed over the assigned OD channel, as indicated by the OD channel register that is managed by the mode elector 228. When in sniffing mode, the assigned sniffing is indicated by the sniffing channel register that is managed by the mode elector 228.

The channel selector 230 may be configured to select the active channel from one of the plurality of radar channels employed by the radar sensor system 104. For example, the channel selector may select one of thirty radar channels that may be available. When in sniffing mode, channel selector 230 selects an unused channel. Once selected, this channel may be called the sniffing channel. When in OD mode, channel selector 230 selects the assigned OD channel to continue to be the active channel. Thus, the active OD channel remains the same channel of the plurality of radar channels.

The channel selector 230 may be configured to effect a switch (i.e., change) of the active channel to another channel. For example, when the mode is changed from sniffing to OD, the channel selector 230 switches the active channel from the assigned sniffing channel to the assigned OD channel. Similarly, when the mode is changed from OD to sniffing, the channel selector 230 switches the active channel from the assigned OD channel to the assigned sniffing channel.

The switch to the sniffing channel may involve additional adjustments that do not occur with a switch to the OD channel. More particularly, in some instances, the switch to a sniffing channel involves a shift in the base frequency, the start time, or both of the sniffing channels from the otherwise regularly intervaled OD channel. Thus, the selection of the sniffing channel includes utilizing an unused channel that is frequency-shifted and/or time-shifted from the OD channel.

As noted herein, in some implementations, successive OD channels occur at fixed (e.g., predictable) intervals of time and frequencies. Thus, relative to the fixed intervals of the predictable OD channels, the sniffing channel introduces a time delta (a slight delay (dt)), frequency delta (change in the base frequency (df)), or both. A sniffing channel with a time delta may be called time-shifted. A sniffing channel with a frequency delta may be called frequency-shifted.

These deltas are introduced to, at least in part, to lessen the chance of self-interference. That is, it lowers the likelihood that the reflection from prior OD chirp from the radar sensor system 104 might be identified as interference from another radar source. The deltas are known and can be factored out with signal processing, which may be done by the signal processor module 236.

The chirp generator 232 may be configured to generate a chirp signal on the active channel. Chirp generation may involve linear phase modulation that modifies the instantaneous frequency. In some implementations, it may employ a non-linear phase modulation. At this point, the generated chirp signal is a reference signal and remains internal to the computing system 200. As of yet, the chirp signal has not been broadcast by the radar sensor system 104. In the OD mode, the chirp generator 232 generates a chirp over the assigned OD channel. In the sniffing mode, the chirp generator 232 generates a chirp over the assigned sniffing channel.

The transmitter/receiver module 234 may be configured to transmit the chirp generated by the chirp generator 232. In the OD mode, the transmitter/receiver module 234 amplifies and transmits the generated chirp over the active channel, which is the assigned OD channel. However, in the sniffing mode, the transmitter/receiver module 234 does not transmit the generated chirp over the active channel, which is the assigned sniffing channel. In some implementations, this may be accomplished by providing no amplification (i.e., gain) of the generated chirp when in sniffing mode. This may be described as attenuating the generated chirp. Since the goal of sniffing is to determine if there is interference, it is not necessary to transmit the chirp over the sniffing channel.

The transmitter/receiver module 234 may be configured to receive and, in some instances, amplify any reflections on the active channel from the transmitted chirp. More precisely, the transmitter/receiver module 234 receives the signal energy of the expected reflections over the active channel. Herein, the term signal energy refers more particularly to signal energy distributed across the frequency range of the channel. In some instances, this may be called energy spectral density. Energy spectral density describes how the energy of a signal or a time series is distributed with frequency. Since the chirp signal has finite total energy, the energy spectral density is particularly suitable.

That signal energy will include reflections from objects in the monitored scene, expected noise, and potentially the transmitted signals from other radar sources (such as second vehicle 112 of FIG. 1). In the OD mode, the transmitter/receiver module 234 potentially receives reflections on the active channel from a chirp transmitted by the radar sensor system 104. From this, candidate objects can be determined. However, in the sniffing mode, the transmitter/receiver module 234 will not receive any reflections on the active channel from a chirp transmitted by the radar sensor system 104. That is because, in sniffing mode, the radar sensor system did not transmit a chirp. Thus, the transmitter/receiver module 234 receives expected noise and potentially interfering signals from other sources. The received signals may be called the RI spectrum, herein. The RI spectrum includes the reflective-intensity information from which objects are detected.

The signal processor module 236 may be configured to process the signal energy received by the transmitter/receiver module 234 over the active channel. At least one of the purposes of this processing is to minimize radar interference caused by transmissions from the radar sensor system itself.

The processing of the signal processor module 236 may include signal amplification, signal mixing, application of a baseband filter, and/or analog to digital conversion. The signal processor module 236 may perform signal amplification by boosting the strength (e.g., gain) of the signal received by the transmitter/receiver module 234. The signal processor module 236 may mix the chirp generated by the chirp generator 232 with the signal received by the transmitter/receiver module 234. In this way, the generated chirp acts as a reference signal to determine the signal strength of the received signal. That is, the signal strength of the received signal is a function of its associated chirp.

The signal processor module 236 may apply a baseband filter (i.e., bandpass filter) to isolate a frequency range of interest (i.e., subject frequency range). The subject frequency range includes frequencies above a bottom cut-off frequency and/or frequencies below a top cut-off frequency. The particular purpose of the baseband filtering is to minimize radar interference caused by transmissions from the radar sensor system itself. The signal processor module 236 may sample the received signal by performing analog to digital conversion.

In addition, the signal processor module 236 may be configured to determine a two-dimensional range-Doppler transform that incorporates (i.e., produces) the range RI spectrum and Doppler RI spectrum. In some implementations, the signal processor module 236 may make this determination by transforming the range RI spectrum by the reflective radar signals, wherein the range RI spectrum includes range bins based on the reflective radar signals by multiple antennas of the radar sensor system. In some instances, the signal processor module 236 may apply a fast Fourier transform (FFT) per each short-duration waveform (e.g., per each chirp signal) and per each antenna of the multiple antennas. The result includes range bins per antenna and per each short-duration waveform (e.g., 100 ms).

In some implementations, the signal processor module 236 may make this determination by transforming the Doppler RI spectrum by the reflective radar signals, wherein the Doppler RI spectrum includes Doppler bins based on the range bins and the reflective radar signals by multiple antennas of the radar sensor system. In some instances, the signal processor module 236 may apply a second FFT per range bin and each antenna. That is, the FFT is applied per each range bin and antenna. Thus, this results in a sequence of bins along the waveforms sequence (for example, one-hundred twenty-eight sequences). The signal processor module 236 may apply the FFT to this sequence to obtain the Doppler bins of each range bin.

In some implementations, the signal processor module 236 may perform at two-dimensional FFT over a short duration of waveforms and a long duration of waveforms. In this respect, the signal processor module 236 produces these two-dimensional FFT processes in the range-Doppler reflection intensity domains of each antenna.

The interference measurement & tracker module 238 may be configured to measure the signal energy of the received signals on the active channel. The interference measurement & tracker module 238 records (thus, tracks) the measured signal energy in association with the active channel. Thus, over time when different channels are the active channel, the interference measurement & tracker module 238 builds a data structure (i.e., list) of signal energy for multiple different channels of the plurality of radar channels. This data structure may include other relevant information (i.e., time of measurement) for the measurements of associated channels.

The interference detector module 240 detects whether the active channel includes interference based, at least in part, on the measured signal energy of the received signals on the active channel. In some implementations, the interference detector module 240 may declare a channel as containing interference if its measured signal energy exceeds an interference threshold. Conversely, the interference detector module 240 may declare a channel as being free of interference (i.e., interference-free channel) if its measured signal energy falls below the interference threshold. The interference threshold may be a predetermined value, which may be updated manually or in an automated update procedure. In other instances, the interference threshold may be determined by a trained machine-learning model, or a procedure based on current conditions.

In addition, the interference detector module 240 may rank or score the interference-free channels based, at least in part, on the channel's measured signal energy. For example, the interference-free channel with the least signal energy may be designated to be the most likely to be free of interference. Also, this ranking or score may be influenced based on how recent the measurement is. The interference detector module 240 may designate the top-ranked interference-free channel as the next active channel. Thus, in response to the detected interference on the OD channel, channel selector 230 switches the active channel to the designated interference-free channel.

The object detector module 242 may be configured to perform additional processing to the range-Doppler transform to incorporate other domains (e.g., azimuth or elevation) to produce an RIV. The object detector module 242 may be configured to analyze the resulting RIV to report on detected or candidate objects to, for example, the perception system 224 of first vehicle 102. In addition, the object detector module 242 may be configured to classify the detected objects in the scene. The object detector module 242 may classify detected objects into an item type, such as a cyclist, animal, car, pedestrian, building, tree, road surface, curb, sidewalk, unknown, and the like. In some instances, the perception system 224 may perform or assist in the performance of object classification.

Figure 3:
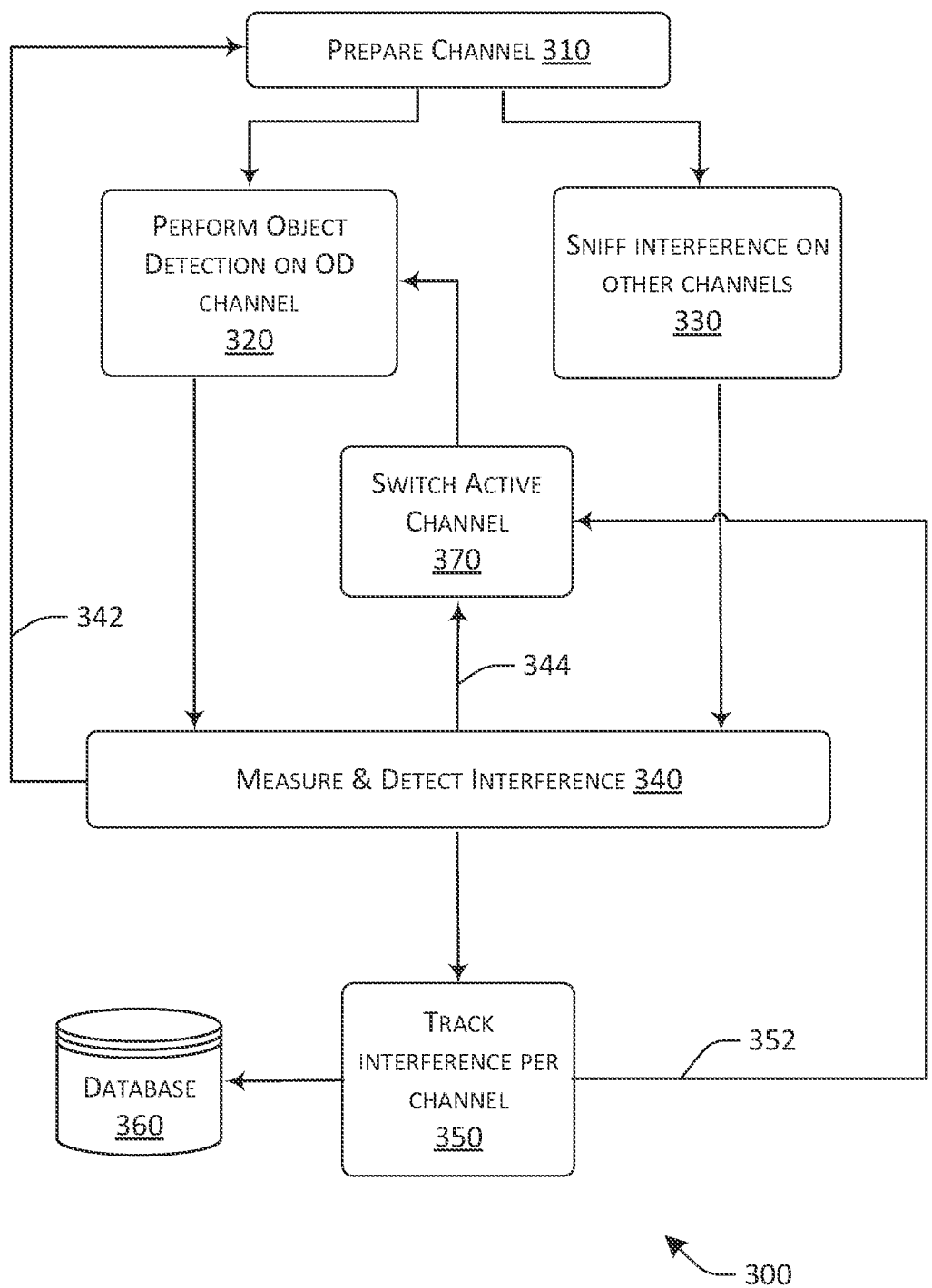
FIG. 3 is a flowchart illustrating a process to perform an example method that facilitates radar-interference mitigation, in accordance with one or more implementations described herein.

FIG. 3 is a flowchart that illustrates a process 300 to perform an example method that facilitates radar-interference mitigation. For ease of illustration, process 300 may be described as being performed by a device or system described herein, such as first vehicle 102 or the computing system 200. However, process 300 may be performed by other devices or a combination of devices and systems.

At operation 310, the computing system may prepare the active channel and elect or choose a mode of operation, which may be, for example, object-detection (OD) mode, sniffing mode, or idle mode. The mode election may affect how other operations of process 300 operate.

In some instances, just one active channel of the multiple (i.e., plurality) of the radar channel of a radar sensor system is operating at a time. That is, the radar sensor system is transmitting and/or receiving over a singular active channel. Consequently, at operation 310, the system may determine whether that active channel is performing purposeful object detection or focused on monitoring for interference.

In addition, at operation 310, the computing system may select the active channel from one of the plurality of radar channels employed by the radar sensor system. When in sniffing mode, the system selects an unused channel, which is now the sniffing channel. When in OD mode, the system selects the assigned OD channel to continue to be the active channel. Thus, the active OD channel remains the same channel of the plurality of radar channels. In some instances, the system may choose to assign another OD channel to be the active channel.

At operations 310, the computing system also may store mutable records or registers that indicate the assigned OD channel and assigned sniffing channel. When in OD mode, object detection is performed over the assigned OD channel, as indicated by the OD channel register. When in sniffing mode, the assigned sniffing is indicated by the sniffing channel register.

In some instances, the computing system effects a switch (i.e., change) of the active channel to another channel. For example, when the mode is changed from sniffing to OD, the system switches the active channel from the assigned sniffing channel to the assigned OD channel. Similarly, when the mode is changed from OD to sniffing, the system switches the active channel from the assigned OD channel to the assigned sniffing channel.

When in the OD mode, process 300 continues to operation 310. When in sniffing mode, process 300 continues to operation 320. In idle mode, the process 300 pauses for a defined or calculated amount of time. In some instances, the pause ends when a particular condition occurs.

At operation 320 in OD mode, the computing system performs object detection by a radar sensor system. The performance of object detection includes both generating and transmitting one or more object-detection (OD) chirps on an OD channel, which is one of the plurality of radar channels employed by a radar sensor system. OD chirps are specifically intended and designed to detect objects. OD chirps are both generated (typically via synchronized chirp generation) and transmitted by the radar sensor system. The OD channel is the assigned (i.e., present) channel being employed for object detection.

At operation 320 in OD mode, the computing system may generate an OD chirp signal on the active channel. At this point, the generated chirp signal is a reference signal and remains internal to the computing system. In the OD mode, the chirp is generated over the assigned OD channel. Indeed, this chirp may be called an OD chirp.

At operation 320 in OD mode, the computing system may amplify and transmit the OD chirp over the active channel, which is the assigned OD channel. Also, the computing system may receive and, in some instances, amplify any reflections on the active channel from the transmitted chirp. More precisely, the computing system receives the signal energy of the expected reflections over the active channel. The received signals may be called the RI spectrum, herein. The RI spectrum includes the reflective-intensity information from which objects are detected.

At operation 320 in OD mode, the computing system may be configured to process the signal energy received by the radar sensor system over the active channel. At least one of the purposes of this processing is to minimize radar interference caused by transmissions from the radar sensor system itself. The processing of the signal may include signal amplification, signal mixing, application of a baseband filter, and/or analog-to-digital conversion.

Further, at operation 320 in OD mode, the computing system may determine a two-dimensional range-Doppler transform that incorporates (i.e., produces) the range RI spectrum and Doppler RI spectrum. Thus, the result is a two-dimensional (2D) RII.

At operation 330 in sniffing mode, the computing system monitors one or more unused radar channels for interference. An unused radar channel is a channel available to be used as the OD channel, but it is not presented assigned as such. An unused radar channel is any channel other than the assigned OD channel. When in sniffing mode, the channel presently being monitored is called the sniffing channel, herein.

At operation 330 in sniffing mode, the computing system may generate a sniffing chirp signal on the active channel, which is the sniffing channel. As of yet, the chirp signal has not been broadcast by the radar sensor system. In the sniffing mode, the generated chirp over the assigned sniffing channel.

The computing system, at operation 330 in sniffing mode, does not transmit the generated chirp. In some implementations, this may be accomplished by providing no amplification (i.e., gain) of the generated sniffing chirp when in sniffing mode. Herein, that may be described as attenuating the generated sniffing chirp. Since the goal of sniffing is to determine if there is interference, it is not necessary to transmit the chirp over the sniffing channel.

At operation 330 in sniffing mode, the computing system may receive and, in some instances, amplify any reflections on the active channel, which is the sniffing channel. More precisely, the computing system receives the signal energy over the active channel. However, in the sniffing mode, the computing system does not receive any reflections on the active channel from a chirp transmitted by the radar sensor system. That is because, in sniffing mode, the radar sensor system did not transmit a chirp. Thus, the computing system receives signals (i.e., RI spectrum) that includes the expected noise and potentially interfering signals from other sources.

At operation 330 in sniffing mode, the computing system may process the signal energy received over the active channel. At least one of the purposes of this processing is to minimize radar interference caused by transmissions from the radar sensor system itself.

The processing of the signal may include signal amplification, signal mixing, application of a baseband filter, and/or analog-to-digital conversion. The computing system may perform signal amplification by boosting the strength (e.g., gain) of the received signal. The computer system may mix the sniffing chirp with the received signal. In this way, the sniffing chirp acts as a reference signal to determine the signal strength of the received signal. That is, the signal strength of the received signal is a function of its associated chirp.

At operation 330 in sniffing mode, the computing system may apply a baseband filter (i.e., bandpass filter) to isolate a frequency range of interest (i.e., subject frequency range). The subject frequency range includes frequencies above a bottom cut-off frequency and/or frequencies below a top cut-off frequency. The particular purpose of the baseband filtering is to minimize radar interference caused by transmissions from the radar sensor system itself. The computing system may sample the received signal by performing analog to digital conversion.

Further, at operation 330 in sniffing mode, the computing system may determine a two-dimensional range-Doppler transform that incorporates (i.e., produces) the range RI spectrum and Doppler RI spectrum. Thus, the result is a two-dimensional (2D) RII.

At operation 340, the computing system receives either RII from the OD detection operation 320 or the sniffing operation 330. The computing system may measure the signal energy of the received signals (as represented in the RII) on the active channel. The computing system transfers this information to operation 350.

At operation 340, the computing system also detects whether the active channel includes interference based, at least in part, on the measured signal energy of the received signals on the active channel. In some implementations, the computing system may declare a channel as containing interference if its measured signal energy exceeds an interference threshold. Conversely, the computing system may declare a channel as being free of interference (i.e., interference-free channel) if its measured signal energy falls below the interference threshold.

In OD mode, if no interference is detected on the OD channel, then the process returns to operation 310. The lack of interference is indicated via dataflow 342. Process 300 starts again (i.e., repeats) at operation 310. In OD mode, if the OD channel exhibits interference, then the process proceeds to operation 370. The interference is indicated via dataflow 344.

At operation 350, the computing system stores (thus, tracks) the measured signal energy in association with the active channel into a database 360. Database 360 is a data structure (i.e., list) of signal energy for multiple different channels of the plurality of radar channels. Thus, over time when different channels are the active channel, the computing system populates the database with relevant signal energy information. Database 360 may include other relevant information (i.e., time of measurement) for the measurements of associated channels.

In addition, at operation 350, the computing system may rank or score the interference-free channels based, at least in part, on the channel's measured signal energy. For example, the interference-free channel with the least signal energy may be designated to be the most likely to be free of interference. Also, this ranking or score may be influenced based on how recent the measurement is. The computing system may designate the top-ranked interference-free channel as the next active channel.

At operation 370, the computing system may effect a switch (i.e., change) of the active channel to another channel. More particularly, when operation 340 indicates that the OD channel exhibits interference, the computing system sets the active channel to the designated top-ranked interference-free channel, which is obtained from operation 350 via dataflow 352. The process returns to OD performance operation 320 with the OD channel set to the designated top-ranked interference-free channel. In this way, the OD performance continues on an active channel that is likely to be interference-free. This switch was an informed one, rather than a blind switch.

While not depicted, the computing system may complete the object detection performance when in the OD mode. That is, the computing system may perform additional processing to the range-Doppler transform to incorporate other domains (e.g., azimuth or elevation) to produce an RIV. The computing system may analyze the resulting RIV to report on detected or candidate objects to, for example, a perception system. In addition, the computing system may classify the detected objects in the scene. The computing system may classify detected objects into an item type, such as a cyclist, animal, car, pedestrian, building, tree, road surface, curb, sidewalk, unknown, and the like.

In one or more implementations, a combination of operations 310-370 of the computing system may be described in the following manner. The computing system performs object detection by the radar sensor system. The OD performance includes generating and transmitting one or more OD chirps on an OD channel. The OD channel is the active channel and the assigned OD channel.

The computing system monitors one or more unused radar channels for interference and determines that at least one of the unused radar channels is free of interference. The monitored channel is called a sniffing channel and generates sniffing chirps on the sniffing channel and receives sniffing-channel signal energy on the sniffing channel. When a sniffing channel is selected, the channel may be frequency-shifted and/or time-shifted from the OD channel. The received signal energy is tracked in association with its channel. In response to that determination, the computing system performs object detection once again, the active channel is now the determined interference-free channel. The interference-free channel may be selected based on its tracked signal energy.

The determination may include measuring radar interference of the sniffing channel based, at least in part, on the sniffing-channel signal energy and determining that the sniffing channel is interference-free based, at least in part, on the measured radar interference of the sniffing channel.

In addition, the computing system may, in response to receiving the sniffing-channel signal energy, process the sniffing-channel signal energy, wherein the processing minimizes radar interference caused by transmissions from the radar sensor system.

In addition, in some implementations, the computing system may include monitoring the OD channel for interference; determining that the OD channel exhibits interference; and switching the OD channel to match the determined interference-free channel. In such implementations, the computing system may receive the OD channel signal energy via the OD channel, the measured radar interference of the OD channel may be used, at least in part, to determine interference on the OD channel, and the OD channel is updated to the determined interference-free channel in response to the interference determination on the OD channel.

In one or more implementations, a combination of operations 310-370 of the computing system may be described in the following manner. The computing system measures radar interference on a first channel of a plurality of radar channels employed by the radar sensor system. The active channel is the first channel, which may be called the sniffing channel, as described herein. The computing system determines that the first channel is interference-free based, at least in part, on the measured radar interference of the first channel.

The computing system performs object detection over a second channel of the plurality of radar channels. The active channel is the second channel, which may be called the OD channel, as described herein. The computing system measures the radar interference on the second channel and determines that the second channel has interference based, at least in part, on the measured radar interference of the second channel. In response to the interference determination, the computing system performs object detection over the first channel of the plurality of radar channels. That is, the active channel of the OD performance is set to the first channel, which was previously the sniffing channel that was found to be interference-free.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels and are not intended to impose numerical or positional requirements on their objects. As used herein, an element or step recited in the singular and preceded by the word "a" or "an" should be understood as not excluding the plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51% to 99% out of a possible extent of 100%", and do not necessarily mean "perfectly", "completely", "strictly", "entirely" or "100%". Additionally, the word "proximate" may be used herein to describe the location of an object or portion thereof concerning another object or portion thereof, and/or to describe the positional relationship of two objects or their respective portions thereof concerning each other, and may mean "near", "adjacent", "close to", "close by", "at" or the like. And, the phrase "approximately equal to" as used herein may mean one or more of "exactly equal to", "nearly equal to", "equal to somewhere between 90% and 110% of" or the like.

This written description uses examples, including the best mode, to enable those skilled in the art to make and use devices, systems, and compositions of matter, and to perform methods, according to this disclosure. It is the following claims, including equivalents, which define the scope of the present disclosure.

What is claimed is:

1. A method that facilitates mitigation of radar interference, the method comprising:
   performing object detection by a radar sensor system, wherein the performing of object detection includes generating and transmitting one or more object-detection (OD) chirps on an OD channel, which is one of a plurality of radar channels employed by the radar sensor system;
   monitoring one or more unused radar channels for interference, wherein the unused radar channels include the plurality of the radar channels other than the OD channel, and wherein the monitoring of the one or more unused radar channels includes, in a sniffing mode, selecting a sniffing channel, which is one of the unused radar channels;
   determining that at least one of the unused radar channels is free of interference; and
   performing object detection by generating and transmitting one or more OD chirps on the determined interference-free channel.

2. A method of claim 1, wherein the monitoring of the one or more unused radar channels additionally includes:
   generating one or more sniffing chirps on the sniffing channel;
   attenuating the one or more sniffing chirps on the sniffing channel; and
   receiving sniffing-channel signal energy via the sniffing channel.

3. A method of claim 2, wherein the selecting of the sniffing channel includes utilizing an unused channel that is frequency-shifted and/or time-shifted from the OD channel.

4. A method of claim 2, wherein the determining includes:
   measuring radar interference of the sniffing channel based, at least in part, on the sniffing-channel signal energy; and
   determining that the sniffing channel is interference-free based, at least in part, on the measured radar interference of the sniffing channel.

5. A method of claim 4, wherein the determining that at least one of the unused radar channels is free of interference includes selecting one of the one or more unused radar channels to be the determined interference-free channel, wherein the selecting is based, at least in part, on the tracked signal energy associated with the one or more selected radar channels.

6. A method of claim 2 further comprising, in response to receiving the sniffing-channel signal energy, processing the sniffing-channel signal energy, wherein the processing minimizes radar interference caused by transmissions from the radar sensor system.

7. A method of claim 1, wherein the monitoring of the one or more unused radar channels include:
   generating sniffing chirps on the one or more unused channels;
   attenuating the one or more sniffing chirps on the one or more unused channels;
   receiving signal energy of the one or more unused channels; and
   tracking the received signal energy in association with the one or more unused channels.

8. A method of claim 1, the method further includes:
   monitoring the OD channel for interference;
   determining that the OD channel exhibits interference; and
   switching the OD channel to match the determined interference-free channel.

9. A method of claim 8, wherein:
   the monitoring of the OD channel includes receiving OD channel signal energy via the OD channel;
   the determining of interference of the OD channel is based, at least in part, on the measured radar interference of the OD channel; and
   the switching includes, in response to the interference determination on the OD channel, updating the OD channel to the determined interference-free channel.

10. A device selected from a group consisting of a vehicle, an autonomous vehicle, a semi-autonomous vehicle, a video surveillance system, a medical imaging system, a video or image editing system, an object tracking system, a video or image search or retrieval system, and a weather forecasting system, the device being configured to perform the method of claim 1.

11. A method that facilitates mitigation of radar interference, the method comprising:
   performing object detection by a radar sensor system, wherein the performing of object detection includes generating and transmitting one or more object-detection (OD) chirps on an OD channel, which is one of a plurality of radar channels employed by the radar sensor system;
   monitoring one or more unused radar channels for interference, wherein the unused radar channels include the plurality of the radar channels other than the OD channel, wherein the monitoring includes, in a sniffing mode, selecting a sniffing channel, which is one of the unused radar channels, generating one or more sniffing chirps on the sniffing channel, and receiving sniffing-channel signal energy via the sniffing channel;
   determining that at least one of the unused radar channels is free of interference following the performance of object detection on the OD channel or the receiving of sniffing-channel signal energy;
   performing object detection by generating and transmitting one or more OD chirps on the determined interference-free channel.

12. A method of claim 11, wherein the selecting of the sniffing channel includes utilizing an unused channel that is frequency-shifted and time-shifted from the OD channel.

13. A method of claim 12, wherein the determining includes:
   measuring radar interference of the sniffing channel based, at least in part, on the sniffing-channel signal energy; and
   determining that the sniffing channel is interference-free based, at least in part, on the measured radar interference of the sniffing channel.

14. A method of claim 11, wherein the monitoring of the one or more unused radar channels includes:
   generating sniffing chirps on the one or more unused channels;

attenuating the one or more sniffing chirps on the sniffing channel receiving the signal energy of the one or more unused channels; and tracking the received signal energy in association with the one or more unused channels.

15. A method of claim 14, wherein the determining that at least one of the unused radar channels is free of interference includes selecting one of the one or more unused radar channels to be the determined interference-free channel, wherein the selecting is based, at least in part, on the tracked signal energy associated with the one or more selected radar channels.

16. A method of claim 11, wherein:

the monitoring of the OD channel includes receiving OD channel signal energy via the OD channel;

the determining interference of the OD channel is based, at least in part, on the measured radar interference of the OD channel; and the switching includes, in response to the interference determination on the OD channel, updating the OD channel to the determined interference-free channel.

17. A non-transitory machine-readable storage medium encoded with instructions executable by one or more processors that, when executed, direct the one or more processors to perform operations that facilitate mitigation of radar interference, the operations comprising:

measuring radar interference on a first channel of a plurality of radar channels employed by a radar sensor system, wherein the measuring of radar interference on the first channel includes, in a sniffing mode, generating sniffing chirps on multiple channels of the plurality of radar channels, the multiple channels include the first channel;

determining that the first channel is interference-free based, at least in part, on the measured radar interference of the first channel;

performing object detection over a second channel of the plurality of radar channels;

measuring radar interference on the second channel;

determining that the second channel has interference based, at least in part, on the measured radar interference of the second channel; and in response to the interference determination, performing object detection over the first channel of the plurality of radar channels.

18. A non-transitory machine-readable storage medium of claim 17, the first channel being frequency-shifted and/or time-shifted from the second channel.

19. A non-transitory machine-readable storage medium of claim 17, wherein the measuring of radar interference on the first channel additionally includes:

attenuating the one or more sniffing chirps on the sniffing channel;

receiving signal energy of the multiple channels; and storing, in a memory, the received signal energy in association with the multiple channels.

20. A non-transitory machine-readable storage medium of claim 19 further comprising selecting the first channel to perform object detection in response to the interference determination, wherein the selection is based, at least in part on, the stored signal energy associated with the first channel.

* * * * *